(12) United States Patent
Stein et al.

(10) Patent No.: US 12,197,568 B2
(45) Date of Patent: Jan. 14, 2025

(54) SYSTEM AND METHOD FOR DETECTION OF ANOMALOUS CONTROLLER AREA NETWORK (CAN) MESSAGES

(71) Applicant: SAFERIDE TECHNOLOGIES LTD., Tel Aviv (IL)

(72) Inventors: Yehiel Stein, Ramat Hasharon (IL); Yossi Vardi, Tel Aviv (IL); Nadav George Costa, Gedera (IL)

(73) Assignee: SAFERIDE TECHNOLOGIES LTD., Tel Aviv-Jaffa (IL)

( * ) Notice: Subject to any disclaimer, the term of this patent is extended or adjusted under 35 U.S.C. 154(b) by 518 days.

(21) Appl. No.: 17/602,781

(22) PCT Filed: Apr. 8, 2020

(86) PCT No.: PCT/IL2020/050432
§ 371 (c)(1),
(2) Date: Oct. 11, 2021

(87) PCT Pub. No.: WO2020/208639
PCT Pub. Date: Oct. 15, 2020

(65) Prior Publication Data
US 2022/0156367 A1   May 19, 2022
US 2024/0411864 A2   Dec. 12, 2024

Related U.S. Application Data

(60) Provisional application No. 62/832,393, filed on Apr. 11, 2019, provisional application No. 62/841,854, filed on May 2, 2019.

(51) Int. Cl.
*G06F 21/55* (2013.01)
*G06F 18/214* (2023.01)
(Continued)

(52) U.S. Cl.
CPC .......... *G06F 21/552* (2013.01); *G06F 18/214* (2023.01); *G06F 21/567* (2013.01);
(Continued)

(58) Field of Classification Search
CPC .... G06F 21/552; G06F 18/214; G06F 21/567; G06F 21/85; G06N 3/04; H04L 12/40013; H04L 2012/40215
See application file for complete search history.

(56) References Cited

U.S. PATENT DOCUMENTS 10,685,109 B2 * 6/2020 Parinov ............... H04L 63/1408
10,846,166 B2 * 11/2020 Sonalker ............... G06F 11/079
(Continued)

OTHER PUBLICATIONS

Taylor, "Anomaly-based detection of malicious activity in in-vehicle networks."\, 2017, 151 pages. (Year: 2017).*
(Continued)

*Primary Examiner* — Yonas A Bayou
(74) *Attorney, Agent, or Firm* — S. J. INTELLECTUAL PROPERTY; Avi Jencmen

(57) ABSTRACT

A system for identifying one or more sub-fields within a field of a given field type, the field comprising a plurality of field bits, and each of the sub-fields comprising a distinct sub-group of the field bits having one or more fixed consecutive bit positions within each instance of a plurality of instances of the field, the system including a processing resource configured to: obtain one or more input time-series, each input time-series of the one or more input time-series including a plurality of input instances of the field; generate one or more new time-series, each new time-series of the generated new time-series being associated with at least one input time-series of the one or more input time-series and including a plurality of new instances of the field; generate a bit-field based on selected instances of the new instances in each new time-series of the generated new time-series;
(Continued)

and analyze the bit-field to identify the fixed consecutive bit positions of at least one of the sub-fields within the field.

20 Claims, 2 Drawing Sheets

(51) Int. Cl.
    *G06F 21/56*     (2013.01)
    *G06F 21/85*     (2013.01)
    *G06K 9/62*     (2022.01)
    *G06N 3/04*     (2023.01)
    *H04L 12/40*     (2006.01)

(52) U.S. Cl.
    CPC ............... *G06F 21/85* (2013.01); *G06N 3/04* (2013.01); *H04L 12/40013* (2013.01); *H04L 2012/40215* (2013.01)

(56) References Cited

U.S. PATENT DOCUMENTS

| | | | | |
|---|---|---|---|---|
| 10,922,906 | B2* | 2/2021 | Wang | G06N 20/00 |
| 10,949,570 | B2* | 3/2021 | Colombo | G06F 21/79 |
| 10,992,697 | B2* | 4/2021 | Keller | G06F 17/11 |
| 11,184,383 | B2* | 11/2021 | Oka | H04L 63/1408 |
| 11,188,643 | B2* | 11/2021 | Chen | G06N 3/044 |
| 11,201,884 | B2* | 12/2021 | Ladd | H04L 41/0894 |
| 11,206,274 | B2* | 12/2021 | Strauss | H04L 63/1416 |
| 11,232,655 | B2* | 1/2022 | Bhattacharyya | H04L 67/12 |
| 2014/0101217 | A1 | 4/2014 | Barakat et al. | |
| 2014/0161139 | A1 | 6/2014 | Evans et al. | |
| 2016/0188876 | A1* | 6/2016 | Harris | G06N 20/00 726/23 |
| 2016/0381059 | A1* | 12/2016 | Galula | H04L 63/02 726/23 |
| 2019/0089963 | A1 | 3/2019 | Jobashi | |
| 2022/0004629 | A1* | 1/2022 | Traub | H04L 63/1416 |

OTHER PUBLICATIONS

Anomaly-based detection of malicious activity in in-vehicle networks, Adrian Taylor, Ottawa-Carleton Institute for Electrical and Computer Engineering University of Ottawa 2017, https://ruor.uottawa.ca/bitstream/10393/36120/3/Taylor_Adrian_2017_thesis.pdf, entire document (especially p. 33-40, p. 55-60, p. 77-78, p. 98-101).

* cited by examiner

SYSTEM AND METHOD FOR DETECTION OF ANOMALOUS CONTROLLER AREA NETWORK (CAN) MESSAGES

TECHNICAL FIELD

The invention relates to a sub-field identification system and method.

BACKGROUND

Structured time-series data, being one or more time-series of data records having a fixed structure, are common in many scenarios, and specifically in different types of communication protocols. Each data record of structured time-series data can include one or more sub-fields arranged in a fixed format that is common to all of the data records of the structured time-series data. The sub-fields in the data records of structured time-series data can be related or unrelated, and can be of different types: flag, counter, numerical, categorical (status/control), etc.

The positions of the sub-fields in the data records of structured time-series data are not always known. Moreover, there can be many different arrangements for the sub-fields in the data records, thereby preventing identification of the positions of the sub-fields. This prevents the undertaking of an analysis of the data in the data records.

There is thus a need in the art for a sub-field identification system and method for identifying a sub-field arrangement of data records in structured time-series data.

GENERAL DESCRIPTION

In accordance with a first aspect of the presently disclosed subject matter, there is provided a system for identifying one or more sub-fields within a field of a given field type, the field comprising a plurality of field bits, and each of the sub-fields comprising a distinct sub-group of the field bits having one or more fixed consecutive bit positions within each instance of a plurality of instances of the field, the system including a processing resource configured to: obtain one or more input time-series, each input time-series of the one or more input time-series including a plurality of input instances of the field; generate one or more new time-series, each new time-series of the generated new time-series being associated with at least one input time-series of the one or more input time-series and including a plurality of new time-series instances of the field; generate a bit-field based on selected instances of the new time-series instances in each new time-series of the generated new time-series; and analyze the bit-field to identify the fixed consecutive bit positions of at least one of the sub-fields within the field.

In some cases, the processing resource is configured to generate the one or more new time-series by: for each input time-series of the one or more input time-series, subtracting each input instance in the input time-series from a subsequent input instance in the input time-series, if any, or subtracting each input instance in the input time-series from a preceding input instance in the input time-series, if any, thereby generating a diff time-series that is associated with the input time-series and that includes a plurality of diff instances of the field; wherein a respective new time-series that is associated with the input time-series is based on the diff time-series.

In some cases, at least one new time-series instance of the new time-series instances of the respective new time-series is a diff instance of the diff instances.

In some cases, the processing resource is further configured to generate the one or more new time-series by: performing a two's complement operation on at least one group of consecutive bits of at least one diff instance of the diff instances to generate at least one new time-series instance of the new time-series instances of the respective new time-series.

In some cases, the at least one group of consecutive bits is at least one suspected sub-field.

In some cases, the at least one group of consecutive bits is all of the bits of the at least one diff instance.

In some cases, the one or more new time-series is a single new time-series, and the processing resource is configured to generate the bit-field by performing a bitwise OR operation on the selected instances of the single new time-series.

In some cases, the processing resource is configured to generate the bit-field by: concatenating the selected instances into a concatenated time series; and performing a bitwise OR operation on the concatenated time series to generate the bit-field.

In some cases, the processing resource is configured to generate the bit-field by: generating one or more intermediate bit-fields, each intermediate bit-field of the intermediate bit-fields being generated by performing a bitwise OR operation on the selected instances of a respective new time-series of the generated new time-series; and combining the intermediate bit-fields to generate the bit-field.

In some cases, the selected instances include one or more conforming new time-series instances, if any, each of the conforming new time-series instances including one or more occurrences of one or more consecutive first bits having a value of 1 at expected positions within the respective conforming new time-series instance, wherein, for each occurrence of the occurrences, a number of consecutive second bits having a value of 0 are present immediately on a left side of the first bits, the number of second bits being greater than a first threshold.

In some cases, the selected instances include one or more non-conforming new time-series instances, if any, provided that the non-conforming new time-series instances appear in at least a first percentage of the new time-series instances in the generated new time-series, the non-conforming new time-series instances being the new time-series instances in the generated new time-series that are not conforming new time-series instances.

In some cases, the processing resource is further configured to generate a list of different bit patterns that appear in the generated new time-series, arranged in a descending order in correspondence to a decreasing frequency of an appearance of each respective bit pattern of the different bit patterns in the generated new time-series.

In some cases, the processing resource is further configured to generate the bit-field based on the selected instances by processing the different bit patterns that appear in the selected instances according to their order of appearance in the list.

In some cases, the processing resource is further configured, after the analyze, to: process at least some of the non-conforming new time-series instances that appear in less than the first percentage of the new time-series instances in the generated new time-series, if any, the at least some of the non-conforming new time-series instances being consistent with a division of the bit-field into sub-fields that is achieved by the analyze of the bit-field.

In some cases, the processing resource is configured, prior to analyzing the bit-field, to identify one or more fixed bit positions of a corresponding one or more flag sub-fields within the field, if any.

In some cases, the processing resource is configured to identify the fixed bit position of at least one flag sub-field of the flag sub-fields, if any, by: determining, for each field bit of the field, a first number of occasions in which a first value of the respective field bit changes at successive input instances in the one or more input time-series; determining, for the respective field bit, a second number of occasions in which the first value of the respective field bit and at least a second value of at least one additional field bit of the field, other than the respective field bit, change at the successive input instances; and upon the second number being less than a given fraction of the first number, identifying the respective field bit as the at least one flag sub-field.

In some cases, the given fraction is one tenth.

In some cases, the processing resource is configured to identify the fixed bit position of at least one flag sub-field of the flag sub-fields, if any, by: determining, for each field bit of the field, a first number of first successive input instances in the one or more input time-series in which a value of the respective field bit changes from a first bit value of 1 to a second bit value of 0 and no other field bits of the field change at the first successive input instances; determining a second number of second successive input instances in the one or more input time-series in which the value of the respective field bit changes from the second bit value to the first bit value and no other field bits of the field change at the second successive input instances, wherein the value of the respective field bit only changes at the first successive input instances and the second successive input instances; and upon determining that an absolute value of a difference between the first number of the first successive input instances and the second number of the second successive input instances is less than a second threshold, identifying the respective field bit as the at least one flag sub-field.

In some cases, the second threshold is a function of a number of the input time-series.

In some cases, upon determining that the absolute value of the difference between the first number of the first successive input instances and the second number of the second successive input instances is greater than or equal to the second threshold, the processing resource is further configured to identify the fixed bit position of the at least one flag sub-field by: determining a second number of occasions in which the respective field bit changes at the first successive input instances in correspondence to a change in the respective field bit at first successive new time-series instances that are in one-to-one correspondence with the first successive input instances; determining a third number of occasions in which the respective field bit changes at the second successive input instances in the one or more input time-series in correspondence to the change in the respective field bit at second successive new time-series instances that are in one-to-one correspondence with the second successive input instances; and upon determining that a first ratio between the second number of occasions and the first number of the first successive input instances is greater than a third threshold and a second ratio between the third number of occasions and the second number of the second successive input instances is greater than a fourth threshold, identifying the respective flag bit as the at least one flag sub-field.

In some cases, the processing resource is configured to identify one or more flag sub-field borders of a corresponding one or more flag sub-fields within the field, if any, based on the fixed bit positions of the flag sub-fields within the field, if any.

In some cases, the analyze includes identifying a right border of the at least one of the sub-fields by: scanning the field bits of the bit-field from left-to-right; for each scanned field bit in the bit-field having a first bit value of 1 at an expected position of the bit-field for the first bit value, with an exception of flag sub-fields, if any, determining a first number of consecutive bits having a second bit value of 0 immediately to the right of the respective scanned field bit; and upon determining that the first number of consecutive bits is greater than a first threshold, identifying the right border of the at least one of the sub-fields at a right side of the respective scanned field bit.

In some cases, the analyze includes identifying a left border of the at least one of the sub-fields by: scanning the field bits of the bit-field from right-to-left; for each scanned field bit in the bit-field having a first bit value of 1 at an expected position of the bit-field for the first bit value, with an exception of flag sub-fields, if any, determining a first number of consecutive bits having a second bit value of 0 immediately to the left of the respective scanned field bit; and upon determining that the first number of consecutive bits is greater than a first threshold, identifying the left border of the at least one of the sub-fields at a left side of a most-significant bit of the first number of consecutive bits.

In some cases, expected positions of the bit-field for the first bit value can be determined based, at least in part, on one or more of: (a) a granularity of a length of each of the sub-fields within the field, (b) position limitations for borders of the sub-fields within the field, or (c) information obtained from at least one other bit-field.

In some cases, the analyze includes: determining two or more consecutive field bits of the field that tend to change simultaneously in the one or more input time-series; and clustering field bits of at least a portion of the bit-field having a plurality of fixed consecutive bit positions into two or more adjacent distinct sub-portions, each adjacent distinct sub-portion of the adjacent distinct sub-portions corresponding to a sub-field within the field, and at least one adjacent distinct sub-portion of the adjacent distinct sub-portions including two or more consecutive field bits that correspond to the consecutive field bits of the field that tend to change simultaneously in the one or more input time-series.

In some cases, the processing resource is configured to determine that the consecutive field bits tend to change simultaneously by: determining a ratio between a first number of input instances in the one or more input time-series in which only some of the consecutive field bits change and a second number of input instances in the one or more input time-series in which the some of the consecutive field bits change together with other bits.

In some cases, the processing resource is configured to determine that the consecutive field bits tend to change simultaneously by counting a number of times that each given field bit of the consecutive field bits changes together with one or more field bits following the given bit field and a number of times that the respective given field bit of the consecutive field bits changes together with one or more field bits preceding the given field bit.

In some cases, the field is a Controller Area Network (CAN) message, and the field type is a CAN message type.

In accordance with a second aspect of the presently disclosed subject matter, there is provided a method for identifying one or more sub-fields within a field of a given field type, the field comprising a plurality of field bits, and each of the sub-fields comprising a distinct sub-group of the field bits having one or more fixed consecutive bit positions within each instance of a plurality of instances of the field, the method comprising: obtaining one or more input time-series, each input time-series of the one or more input time-series including a plurality of input instances of the field; generating one or more new time-series, each new time-series of the generated new time-series being associated with at least one input time-series of the one or more input time-series and including a plurality of new time-series instances of the field; generating a bit-field based on selected instances of the new time-series instances in each new time-series of the generated new time-series; and analyzing the bit-field to identify the fixed consecutive bit positions of at least one of the sub-fields within the field.

In some cases, the generating of the one or more new time-series comprises: for each input time-series of the one or more input time-series, subtracting each input instance in the input time-series from a subsequent input instance in the input time-series, if any, or subtracting each input instance in the input time-series from a preceding input instance in the input time-series, if any, thereby generating a diff time-series that is associated with the input time-series and that includes a plurality of diff instances of the field; wherein a respective new time-series that is associated with the input time-series is based on the diff time-series.

In some cases, at least one new time-series instance of the new time-series instances of the respective new time-series is a diff instance of the diff instances.

In some cases, the generating of the one or more new time-series comprises: performing a two's complement operation on at least one group of consecutive bits of at least one diff instance of the diff instances to generate at least one new time-series instance of the new time-series instances of the respective new time-series.

In some cases, the at least one group of consecutive bits is at least one suspected sub-field.

In some cases, the at least one group of consecutive bits is all of the bits of the at least one diff instance.

In some cases, the one or more new time-series is a single new time-series, and the generating of the bit-field comprises: performing a bitwise OR operation on the selected instances of the single new time-series.

In some cases, the generating of the bit-field comprises: concatenating the selected instances into a concatenated time series; and performing a bitwise OR operation on the concatenated time series to generate the bit-field.

In some cases, the generating of the bit-field comprises: generating one or more intermediate bit-fields, each intermediate bit-field of the intermediate bit-fields being generated by performing a bitwise OR operation on the selected instances of a respective new time-series of the generated new time-series; and combining the intermediate bit-fields to generate the bit-field.

In some cases, the selected instances include one or more conforming new time-series instances, if any, each of the conforming new time-series instances including one or more occurrences of one or more consecutive first bits having a value of 1 at expected positions within the respective conforming new time-series instance, wherein, for each occurrence of the occurrences, a number of consecutive second bits having a value of 0 are present immediately on a left side of the first bits, the number of second bits being greater than a first threshold.

In some cases, the selected instances include one or more non-conforming new time-series instances, if any, provided that the non-conforming new time-series instances appear in at least a first percentage of the new time-series instances in the generated new time-series, the non-conforming new time-series instances being the new time-series instances in the generated new time-series that are not conforming new time-series instances.

In some cases, the method further comprises: generating a list of different bit patterns that appear in the generated new time-series, arranged in a descending order in correspondence to a decreasing frequency of an appearance of each respective bit pattern of the different bit patterns in the generated new time-series.

In some cases, the generating the bit-field comprises: processing the different bit patterns that appear in the selected instances according to their order of appearance in the list.

In some cases, the method further comprises: processing at least some of the non-conforming new time-series instances that appear in less than the first percentage of the new time-series instances in the generated new time-series, if any, after the analyzing of the bit-field, the at least some of the non-conforming new time-series instances being consistent with a division of the bit-field into sub-fields that is achieved by the analyzing of the bit-field.

In some cases, the method further comprises: identifying, prior to the analyzing of the bit-field, one or more fixed bit positions of a corresponding one or more flag sub-fields within the field, if any.

In some cases, the identifying comprises: identifying the fixed bit position of at least one flag sub-field of the flag sub-fields, if any, by: determining, for each field bit of the field, a first number of occasions in which a first value of the respective field bit changes at successive input instances in the one or more input time-series; determining, for the respective field bit, a second number of occasions in which the first value of the respective field bit and at least a second value of at least one additional field bit of the field, other than the respective field bit, change at the successive input instances; and upon the second number being less than a given fraction of the first number, identifying the respective field bit as the at least one flag sub-field.

In some cases, the given fraction is one tenth.

In some cases, the identifying comprises: identifying the fixed bit position of at least one flag sub-field of the flag sub-fields, if any, by: determining, for each field bit of the field, a first number of first successive input instances in the one or more input time-series in which a value of the respective field bit changes from a first bit value of 1 to a second bit value of 0 and no other field bits of the field change at the first successive input instances; determining a second number of second successive input instances in the one or more input time-series in which the value of the respective field bit changes from the second bit value to the first bit value and no other field bits of the field change at the second successive input instances, wherein the value of the respective field bit only changes at the first successive input instances and the second successive input instances; and upon determining that an absolute value of a difference between the first number of the first successive input instances and the second number of the second successive input instances is less than a second threshold, identifying the respective field bit as the at least one flag sub-field.

In some cases, the second threshold is a function of a number of the input time-series.

In some cases, upon determining that the absolute value of the difference between the first number of the first successive input instances and the second number of the second successive input instances is greater than or equal to the second threshold, the identifying the fixed bit position of the at least one flag sub-field further comprises: determining a second number of occasions in which the respective field bit changes at the first successive input instances in correspondence to a change in the respective field bit at first successive new time-series instances that are in one-to-one correspondence with the first successive input instances; determining a third number of occasions in which the respective field bit changes at the second successive input instances in the one or more input time-series in correspondence to the change in the respective field bit at second successive new time-series instances that are in one-to-one correspondence with the second successive input instances; and upon determining that a first ratio between the second number of occasions and the first number of the first successive input instances is greater than a third threshold and a second ratio between the third number of occasions and the second number of the second successive input instances is greater than a fourth threshold, identifying the respective flag bit as the at least one flag sub-field.

In some cases, the method further comprises: identifying one or more flag sub-field borders of a corresponding one or more flag sub-fields within the field, if any, based on the fixed bit positions of the flag sub-fields within the field, if any.

In some cases, the analyzing comprises identifying a right border of the at least one of the sub-fields by: scanning the field bits of the bit-field from left-to-right; for each scanned field bit in the bit-field having a first bit value of 1 at an expected position of the bit-field for the first bit value, with an exception of flag sub-fields, if any, determining a first number of consecutive bits having a second bit value of 0 immediately to the right of the respective scanned field bit; and upon determining that the first number of consecutive bits is greater than a first threshold, identifying the right border of the at least one of the sub-fields at a right side of the respective scanned field bit.

In some cases, the analyzing comprises identifying a left border of the at least one of the sub-fields by: scanning the field bits of the bit-field from right-to-left; for each scanned field bit in the bit-field having a first bit value of 1 at an expected position of the bit-field for the first bit value, with an exception of flag sub-fields, if any, determining a first number of consecutive bits having a second bit value of 0 immediately to the left of the respective scanned field bit; and upon determining that the first number of consecutive bits is greater than a first threshold, identifying the left border of the at least one of the sub-fields at a left side of a most-significant bit of the first number of consecutive bits.

In some cases, expected positions of the bit-field for the first bit value can be determined based, at least in part, on one or more of: (a) a granularity of a length of each of the sub-fields within the field, (b) position limitations for borders of the sub-fields within the field, or (c) information obtained from at least one other bit-field.

In some cases, the analyzing includes: determining two or more consecutive field bits of the field that tend to change simultaneously in the one or more input time-series; and clustering field bits of at least a portion of the bit-field having a plurality of fixed consecutive bit positions into two or more adjacent distinct sub-portions, each adjacent distinct sub-portion of the adjacent distinct sub-portions corresponding to a sub-field within the field, and at least one adjacent distinct sub-portion of the adjacent distinct sub-portions including two or more consecutive field bits that correspond to the consecutive field bits of the field that tend to change simultaneously in the one or more input time-series.

In some cases, the determining that the consecutive field bits tend to change simultaneously comprises: determining a ratio between a first number of input instances in the one or more input time-series in which only some of the consecutive field bits change and a second number of input instances in the one or more input time-series in which the some of the consecutive field bits change together with other bits.

In some cases, the determining that the consecutive field bits tend to change simultaneously comprises: counting a number of times that each given field bit of the consecutive field bits changes together with one or more field bits following the given bit field and a number of times that the respective given field bit of the consecutive field bits changes together with one or more field bits preceding the given field bit.

In some cases, the field is a Controller Area Network (CAN) message, and the field type is a CAN message type.

In accordance with a third aspect of the presently disclosed subject matter, there is provided a non-transitory computer readable storage medium having computer readable program code embodied therewith, the computer readable program code, executable by at least one processing resource of a computer to perform a method for identifying one or more sub-fields within a field of a given field type, the field comprising a plurality of field bits, and each of the sub-fields comprising a distinct sub-group of the field bits having one or more fixed consecutive bit positions within each instance of a plurality of instances of the field, the method comprising: obtaining one or more input time-series, each input time-series of the one or more input time-series including a plurality of input instances of the field; generating one or more new time-series, each new time-series of the generated new time-series being associated with at least one input time-series of the one or more input time-series and including a plurality of new time-series instances of the field; generating a bit-field based on selected instances of the new time-series instances in each new time-series of the generated new time-series; and analyzing the bit-field to identify the fixed consecutive bit positions of at least one of the sub-fields within the field.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
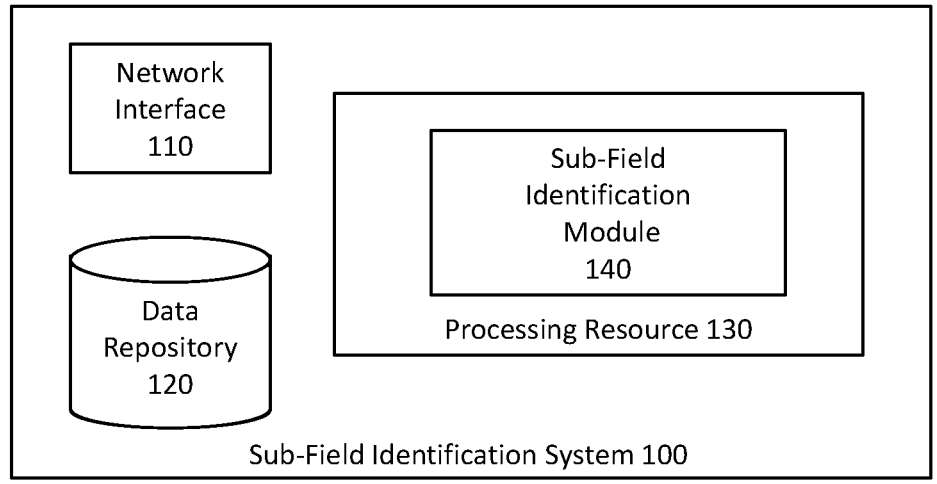
FIG. 1 is a block diagram schematically illustrating one example of a sub-field identification system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "generating", "analyzing", "subtracting", "performing", "concatenating", "combining", "determining", "validating", "comparing", "clustering", "counting", "identifying" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
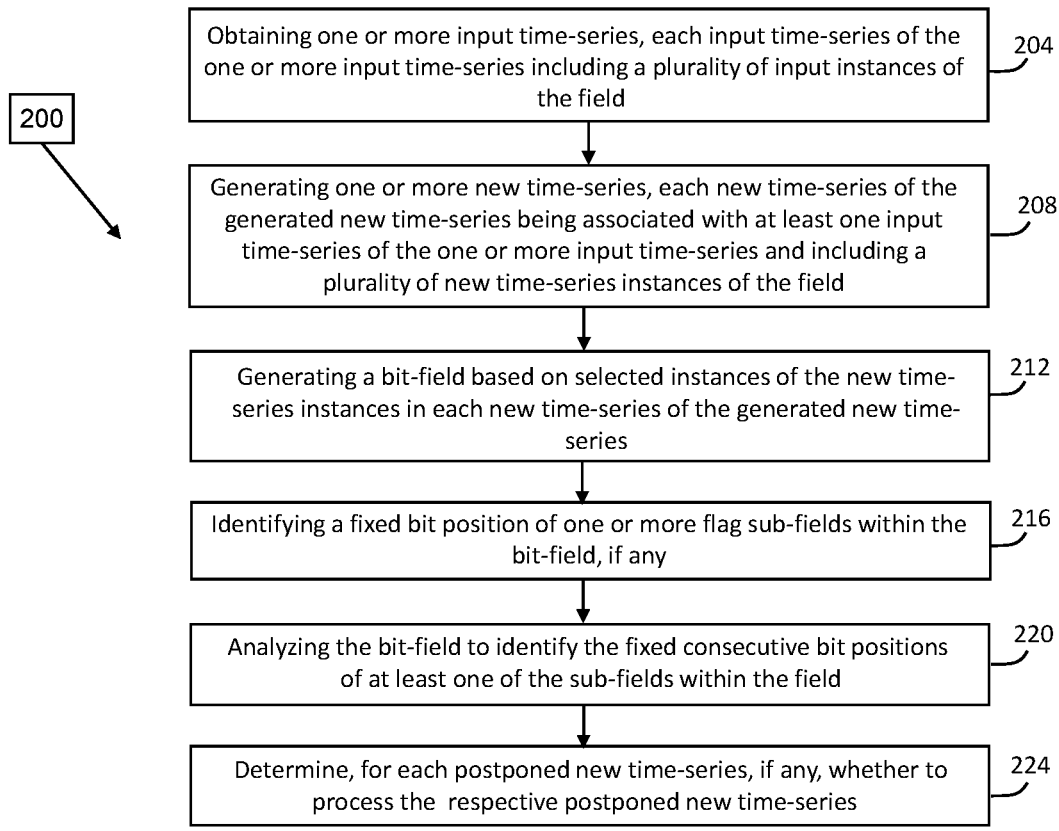
FIG. 2 is a flowchart illustrating one example of a sequence of operations for identifying the fixed consecutive bit positions of at least one of the sub-fields within a field of a given field type, in accordance with the presently disclosed subject matter.

In embodiments of the presently disclosed subject matter, fewer, more and/or different stages than those shown in FIG. 2 may be executed. FIG. 1 illustrates a general schematic of a sub-field identification system in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of a sub-field identification system 100, in accordance with the presently disclosed subject matter.

In accordance with the presently disclosed subject matter, sub-field identification system 100 can be configured to identify one or more sub-fields within a field of a given field type. The field can comprise a plurality of field bits, and each of the sub-fields can comprise a distinct group of the field bits having one or more fixed consecutive bit positions within each instance of a plurality of instances of the field. The following is a structure of an example field of a given field type that includes two different types of sub-fields (i.e., counter and numerical):

| Counter A | Counter B | Numerical |
|---|---|---|

Sub-field identification system 100 can be configured to identify the division of fields of many field types into their distinct sub-fields, including identifying the division of the example field shown above into its three distinct sub-fields (but not necessarily identifying the data-type of each of the distinct sub-fields). Sub-field identification system can be configured to identify the division of a field of a given field type based on input instances of the field, as detailed further herein, inter alia with reference to FIG. 2, the input instances being included in one or more structured input time-series of the given field type. In some cases, each of the input instances in one or more structured input time-series of a given field type can be a Controller Area Network (CAN) message, such that the given field type is a CAN message type (e.g. Message Identifier (MID)).

For the purpose of identifying one or more sub-fields within a field of a given field type, sub-field identification system 100 can comprise a network interface 110 that is configured to connect the sub-field identification system 100 to one or more communication networks, such as the Internet, and to enable the sub-field identification system 100 to send and receive data via the communication networks. The data received via the communication networks can include one or more input time-series and, optionally, data that can be helpful for identifying the one or more sub-fields within a given field (e.g., a granularity of sub-field length, position limitations, etc.).

Sub-field identification system 100 can further comprise or be otherwise associated with a data repository 120 (e.g. a database, a storage system, a memory including Read Only Memory—ROM, Random Access Memory—RAM, and/or any other type of memory, etc.) configured to store data, including, inter alia, data received via the communication networks. In some cases, data repository 120 can be further configured to enable retrieval and/or update and/or deletion of the stored data. It is to be noted that in some cases, data repository 120 can be distributed.

Sub-field identification system 100 can further comprise a processing resource 130. Processing resource 130 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of the sub-field identification system 100 and for enabling operations related to resources of the sub-field identification system 100.

Processing resource 130 can be configured to include a sub-field identification module 140 for identifying the fixed consecutive bit positions of at least one of the sub-fields within a field of a given field type, as detailed further herein, inter alia with reference to FIG. 2.

Attention is now drawn to FIG. 2, a flowchart illustrating one example of a sequence of operations 200 for identifying the fixed consecutive bit positions of at least one of the sub-fields within a field of a given field type, in accordance with the presently disclosed subject matter.

In accordance with the illustrated example, sub-field identification module 140 can be configured to obtain one or more input time-series. Each input time-series of the one or more input time-series can include a plurality of input instances of the field of the given field type (block 204).

Sub-field identification module 140 can be further configured to generate one or more new time-series, each new time-series of the generated new time-series being associated with at least one input time-series of the one or more input time-series and including a plurality of new time-series instances of the field of the given field type (block 208). Sub-field identification module 140 can be configured to identify the fixed consecutive bit positions of at least one sub-field within the field of the given field type based on the generated new time-series, as detailed below.

Figure 3:
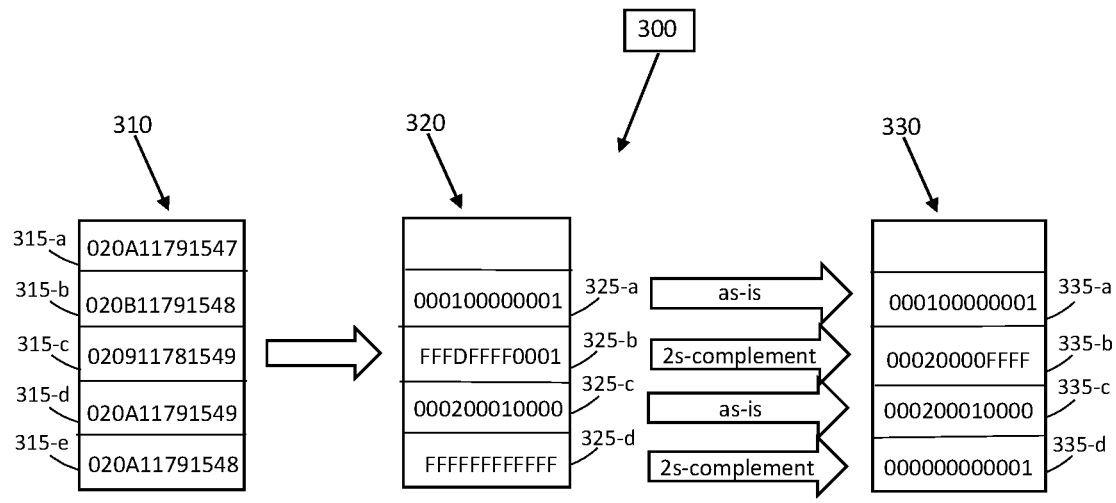
FIG. 3 illustrates one example of a sequence of operations for generating a new time-series associated with a corresponding input time-series.

Before continuing to detail the sequence of operations 200 for identifying the fixed consecutive bit positions of at least one sub-field within the field of the given field type, attention is drawn to FIG. 3, which illustrates one example of a sequence of operations for generating a new time-series that is associated with a corresponding input time-series.

FIG. 3 illustrates an example of an input time-series 310. For the purpose of the example, input time-series 310 can include five input instances (315-*a* through 315-*e*) of the field of the given field type. A diff time-series 320 can be generated based on the input time-series 310, and a new time-series 330 can be generated based on the diff time-series 320, as explained in detail below. For purposes of the example, diff time-series 320 can include four diff instances (325-*a* through 325-*d*) of the field of the given field type, and new time-series 330 can include a corresponding four new time-series instances (335-*a* through 335-*d*) of the field of the given field type.

To generate the diff time-series 320, sub-field identification module 140 can be configured to subtract each input instance (315-*a*, 315-*b*, 315-*c*, 315-*d*) in the input time-series 310 from a subsequent input instance (315-*b*, 315-*c*, 315-*d*, 315-*e*, respectively) in the input time-series, if any (as illustrated in FIG. 3), or subtract each input instance in the input time-series from a preceding input instance in the input time-series, if any.

In some cases (not as illustrated in FIG. 3), the new time-series 330 can be the diff time-series 320. As a non-limiting example, if each of the sub-fields in the field of the given field type is a counter or a numerical sub-field having a locality characteristic, and the values of each of the sub-fields stay unchanged or increase between each pair of successive input instances (input instance 315-*b* is successive to input instance 315-*a*, etc.), the new time-series 330 can be the diff time-series 320. It is to be noted that a numerical sub-field having a locality characteristic is a numerical sub-field whose value stays unchanged or changes by less than a first threshold between each pair of successive input instances. In some cases, the first threshold can be half of the bits of a minimum sub-field size to be identified.

Returning to the generation of the new time-series 330, in some cases, as illustrated in FIG. 3, sub-field identification module 140 can be configured to generate the new time-series 330 such that one or more of the new time-series instances in the new time-series are identical to their corresponding diff instances (e.g., 335-*a* and 335-*c*) and a different one or more of the new time-series instances are a two's complement of their corresponding diff instances (e.g., 335-*b* and 335-*d*). Sub-field identification module 140 can be configured to generate the new time-series instances that are a two's complement of their corresponding diff instances (e.g., 335-*b* and 335-*d*) by performing a two's complement operation on each of the corresponding diff instances (e.g., 335-*b* and 335-*d*). In some cases, sub-field identification module 140 can be configured to maintain a diff instance as a new time-series instance when one or more of the most significant bits of the diff instance are set to 0, and to perform a two's complement on a diff instance when one or more of the most significant bits of the diff instance are set to 1, as shown in FIG. 3.

It is to be noted that a two's complement operation on a diff instance to generate a corresponding new time-series instance can result in the corresponding new times-series instance having a desired form for identifying the sub-fields within the field when a value of at least one of the sub-fields within the field decreases between two successive input instances (e.g., input instances 315-*d* and 315-*e*) associated with the corresponding new time-series instance (e.g., new time-series instance 335-*d*) and a value of the remaining sub-fields within the field either decrease or remain constant between the two successive input instances.

In some cases, a new time-series instance can be of a desired form when each occurrence of one or more consecutive first bits having a value of 1 at expected positions within the new time-series instance is preceded by a number of consecutive second bits having a value of 0 (i.e., the consecutive second bits are immediately to the left of the first bits) that is greater than the first threshold (the first threshold being defined above). New time-series instances of a desired form are referred to hereinafter as "conforming new time-series instances", and new time-series instances that are not of a desired form are referred to herein as "non-conforming new time-series instances".

In some cases, expected positions for the first bits can be determined based, at least in part, on additional prior knowledge. In some cases, such additional prior knowledge can be a granularity of a length of the sub-fields within the field (e.g. a length of each of the sub-fields is always a multiple of n-bits). Additionally, or alternatively, in some cases, such additional prior knowledge can be position limitations regarding possible locations of sub-field borders within the field (e.g., borders between the sub-fields are always aligned to a multiple of m-bits of the field). Additionally, or as a further alternative, such additional prior knowledge can be obtained by consulting at least one other bit-field, for example, to determine one or more of: the field bits that are static, the field bits that do not change within each time-series, the field bits that are always 0, the field bits that are flag bits, etc.).

In some cases, the expected positions can be all of the bit positions within the field of the new time-series instance.

In some cases, a non-conforming new time-series instance can be a new time-series instance that includes at least one occurrence of a number of consecutive bits having a bit value of 1 that is greater than or equal to the first threshold (e.g. eight or more consecutive bits having a bit value of 1 when a minimum sub-field size to be identified is 16 bits). As an illustrative example, new time-series instances 335-a, 335-c and 335-d in FIG. 3 are conforming new time-series instances and new time-series instance 335-b in FIG. 3 is a non-conforming new time-series instance.

In some cases (not as illustrated in FIG. 3), sub-field identification module 140 can be configured to generate the new time-series 330 such that all of the new time-series instances in the new time-series are a two's complement of their corresponding diff instances. As a non-limiting example, if each of the sub-fields in the field of the given field type is a decreasing counter or another decreasing numerical sub-field having a locality characteristic, i.e. the values of each of the sub-fields stay unchanged or decrease by less than the first threshold between each pair of successive input instances (input instance 315-b is successive to input instance 315-a, etc.), all of the new time-series instances can be a two's complement of their corresponding diff instances.

In some cases in which a diff instance and its two's complement is not of a desired form (for example, diff instance 325-b or new time-series instance 335-b), sub-field identification module 140 can be configured to generate a new time-series instance having a desired form (i.e., a conforming new time-series instance) by performing a two's complement operation on at least one group of consecutive bits of the diff instance or its two's complement, but not on all of the bits of the diff instance or its two's complement. In some cases, the at least one group of consecutive bits can be one or more suspected sub-fields identified in accordance with at least one signature formed by the at least one group of consecutive bits. In some cases, the at least one signature can be a number of consecutive bits having a bit value of 1 that is greater than or equal to the first threshold (e.g., eight or more consecutive bits having a bit value of 1 when a minimum sub-field size to be identified is 16 bits).

As a non-limiting example, with respect to the example of a sequence of operations for generating a new time-series that is illustrated in FIG. 3, sub-field identification module 140 can be configured to perform a two's complement operation on first consecutive field bits of diff instance 325-b (represented by hexadecimal numerals 'FFFDFFFF') that are not of a desired form (i.e., include a number of consecutive bits having a bit value of 1 that is greater than the first threshold), and to leave unchanged second consecutive field bits of the diff instance 325-b (represented by hexadecimal numerals '0001') that are of a desired form for identifying one or more sub-fields within the field, thereby generating a conforming new time-series instance.

An alternative manner for generating a conforming new time-series instance in a case in which the corresponding diff instance and its two's complement is not of a desired form (i.e., is not conforming) can be to reverse each of the bits in the at least one group of consecutive bits of the diff instance or its two's complement that is not of a desired form.

A further alternative can be to perform a two's complement operation on some of the at least one group of consecutive bits, for example, all of the at least one group of consecutive bits expect for the least significant bit (which can be left unchanged).

In some cases in which a diff instance and its two's complement is not of a desired form, the diff instance can be ignored, e.g. by not generating a new time-series instance that corresponds to the diff instance or by ignoring the new time-series instance, if generated. In some cases, a new time-series instance that is not of a desired form (i.e., a non-conforming new time-series instance) can be ignored if it appears in less than a first percentage of one or more generated new time-series. In some cases, the first percentage can be one one-thousandth of the new time-series instances within the generated new time-series.

Alternatively, in some cases in which a diff instance and its two's complement is not of a desired form, sub-field identification module 140 can be configured to postpone the possible generation and processing of a new time-series instance that corresponds to the diff instance or to postpone a possible processing of the new time-series instance, if generated, until a bit-field is generated (generation of the bit-field is described below with respect to block 212). In some cases, the possible processing of a new time-series instance that is not of a desired form (i.e., a non-conforming new time-series instance) can be postponed if the new time-series instance appears in less than the first percentage of one or more generated new time-series (the first percentage being defined above). Such a new time-series instance is referred to hereinafter as a "postponed new time-series instance".

Returning to the sequence of operations 200, sub-field identification module 140 can be configured to generate the bit-field based on selected instances of the new time-series instances in each new time-series of the generated one or more new time-series (block 212). The selected instances can include at least some of the conforming new time-series instances, if any. In some cases, the selected instances can include all of the conforming new time-series instances, if any. Additionally, in some cases, the selected instances can include non-conforming new time-series instances if any, provided that the bit patterns of the non-conforming new time-series instances appear in at least a first percentage of the new time-series instances in the one or more generated new time-series (the first percentage being defined above).

As a non-limiting example, if we suspect that or want to be prepared for the case in which the specific field-type is built of one or more numerical sub-fields that generally have a locality characteristic but rarely do not have a locality characteristic, sub-field identification module 140 can be configured to select as selected instances only (a) conforming new time-series instances or (b) non-conforming new time-series instances that appear in the at least the first percentage of the new time-series instances within the generated new time-series. This enables preventing the processing of new time-series instances that correspond to input instances that include non-local changes (with respect to their respective immediately prior input instances) in one or more numerical sub-fields that generally have the locality characteristic. Non-limiting examples of numerical sub-fields that generally have a locality characteristic but occasionally do not have a locality characteristic are the following:

A trip-meters counter of a car, which may reset each time it reaches 1000, or

A temperature measurement sub-field that usually changes gradually, but may sometimes experience a rapid change, e.g. when turning on the air-conditioning unit.

In some cases, sub-field identification module 140 can be configured to generate a list of the different bit patterns that appear in the new time-series, arranged in a descending order in correspondence to a decreasing frequency of an appearance of the bit pattern. In some cases, this can enable selecting non-conforming new time-series instances as selected instances if the bit patterns of the non-conforming new time-series instances appear in the at least the first percentage of the new time-series instances in the new time-series. This also can enable a performance increase of the procedure for generating the bit-field, as each bit-pattern in the new time-series can be processed once instead of being processed again and again in the same way each time it appears. In addition, the 'acceptable' check (i.e., the validation step of block 224) can also be enhanced, as postponed new time-series instances can be checked in light of all the already-processed bit-patterns, by performing the same checks on the bitwise—or operations of all the bit-patterns already selected, with the addition of the currently processed bit pattern of the postponed new time-series instance.

Having discussed the manner in which sub-field identification module 140 can be configured to select the selected instances of the new time-series instances to generate the bit-field, we now turn to a discussion regarding the manner in which the sub-field identification module 140 can be configured, based on the selected instances, to generate the bit-field.

In some cases, the generated new time-series can be a single new time-series, and sub-field identification module 140 can be configured to generate the bit-field by performing a bitwise OR operation on the selected instances of the single new time-series.

In some cases, the generated new time-series can be a plurality of new time-series. In some of these cases, sub-field identification module 140 can be configured to generate the bit-field by: (a) concatenating the selected instances of the plurality of new time-series to generate a single concatenated new time-series including the selected instances of each of the plurality of new time-series; and (b) performing a bitwise OR operation on the concatenated new time-series to generate the bit-field.

Alternatively, in some of these cases, sub-field identification module 140 can be configured to generate the bit-field by: (a) generating one or more intermediate bit-fields, each intermediate bit-field of the intermediate bit-fields being generated by performing a bitwise OR operation on the selected instances of a respective new time-series of the plurality of new time-series; and (b) combining the intermediate bit-fields to generate the bit-field.

Figure 4:
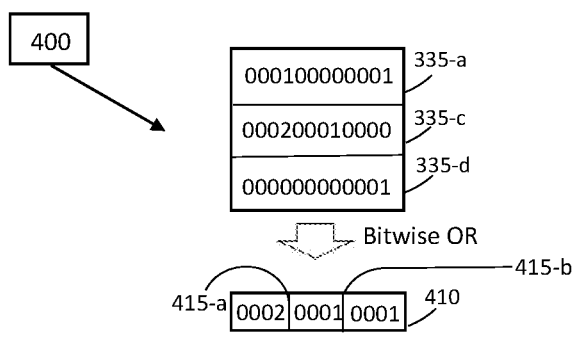
FIG. 4 is an illustration of one example for generating a bit-field based on a new time-series.

Attention is now drawn to FIG. 4, which illustrates the generation of a bit-field (or an intermediate bit-field) based on selected instances of the new time-series 330 of FIG. 3. In the illustration of FIG. 4, the selected instances are new time-series instances 335-a, 335-c and 335-d of the new time-series 330. A bitwise OR operation is performed on the new time-series instances 335-a, 335-c and 335-d to generate a bit-field (or an intermediate bit-field) 410. As will be explained below, the borders (415-a, 415-b) between the sub-fields in the bit-field 410 can be identified based on a cursory observation of the bit-field 410.

Returning to the sequence of operations 200, in some cases, prior to analyzing the bit-field (e.g., bit-field 410), sub-field identification module 140 can be configured to identify a fixed bit position of one or more flag sub-fields within the bit-field, if any (block 216).

In some cases, sub-field identification module 140 can be configured to identify the fixed bit position of the flag sub-fields by: (a) determining, for each field bit of the field, a first number of occasions in which a first value of the respective field bit changes between (i.e., at) successive input instances in the one or more input time-series; (b) determining, for the respective field bit, a second number of occasions in which the first value of the respective field bit and at least a second value of at least one additional field bit of the field, other than the respective field bit, change at the successive input instances; and (c) upon the second number being less than a given fraction of the first number, identifying the respective field bit as a flag sub-field. In some cases, the given fraction is one tenth.

In some cases, sub-field identification module 140 can be configured to identify the fixed bit position of the one or more flag sub-fields, if any, by: (a) determining, for each field bit of the field, a first number of first successive input instances in the one or more input time-series in which a value of the respective field bit changes from a first bit value of 1 to a second bit value of 0 and no other field bits of the field change at the first successive input instances; (b) determining a second number of second successive input instances in the one or more input time-series in which the value of the respective field bit changes from the second bit value to the first bit value and no other field bits of the field change at the second successive input instances, wherein the value of the respective field bit only changes at the first successive input instances and at the second successive input instances; and (c) upon determining that an absolute value of a difference between the first number of the first successive input instances and the second number of the second successive input instances is less than a second threshold, identifying the respective field bit as a flag sub-field. In some cases, the second threshold can be a function of the number of input time-series. In some cases, the second threshold can be a maximum of: (a) a number of the input time-series and (b) one one-thousandth of a total number of input instances in the input time-series.

In some cases, upon determining that the absolute value of the difference between the first number of the first successive input instances and the second number of the second successive input instances is greater than or equal to the second threshold, sub-field identification module 140 can be further configured to identify the fixed bit position of the flag sub-field by: (a) determining a second number of occasions in which the respective field bit changes between (i.e., at) the first successive input instances in correspondence to a change in the respective field bit at first successive new instances that are in one-to-one correspondence with the first successive input instances; (b) determining a third number of occasions in which the respective field bit changes at the second successive input instances in correspondence to the change in the respective field bit at second successive new instances that are in one-to-one correspondence with the second successive input instances; and (c) upon determining that a first ratio between the second number of occasions and the first number of the first successive input instances is greater than a third threshold and a second ratio between the third number of occasions and the second number of the second successive input instances is greater than a fourth threshold, identifying the respective flag bit as the flag sub-field. In some cases, the third threshold can be 1−(2*a number of input time-series/a total number of input instances in the input time-series). In some cases, the fourth threshold can also be 1−(2*a number of input time-series/a total number of input instances in the input time-series).

Returning to the sequence of operations 200, sub-field identification module 140 can be configured to analyze the bit-field (e.g., bit-field 410) to identify the fixed consecutive bit positions of at least one of the sub-fields within the field (block 220). In some cases, the sub-field identification module 140 can be configured to analyze the bit-field after identifying a fixed bit position of one or more flag sub-fields within the bit-field, if any, as detailed earlier herein.

Sub-field identification module 140 can be configured to analyze the bit-field to identify a border of at least one sub-field of the field. In some cases, the bit-field can be analyzed to identify a right border of the at least one sub-field by scanning the field bits of the bit-field from left-to-right. For each scanned field bit in the bit-field having a first bit value of 1 at an expected position of the bit-field for the first bit value, with the exception of identified flag sub-fields, if any, sub-field identification module 140 can be configured to determine a first number of consecutive bits having a second bit value of 0 immediately following the respective scanned field bit, i.e. on the least-significant (right) side of the respective scanned field bit. Upon determining that the first number of consecutive bits is greater than a first threshold, sub-field identification module 140 can be configured to identify the right border of the at least one sub-field at a right side of the respective scanned field bit.

In some cases, the expected positions of the bit-field for the first bit value of 1 can be determined based, at least in part, on additional prior knowledge. In some cases, such additional prior knowledge can be a granularity of the sub-field length (e.g., sub-fields are always a multiple of n-bits). Additionally, or alternatively, in some cases, such additional prior knowledge can be position limitations (e.g., sub-field borders are always located at a multiple of m-bits within the bit field). Additionally, or as a further alternative, such additional prior knowledge can be obtained by consulting at least one other bit-field, for example, to determine one or more of: the field bits that are static, the field bits that do not change within each time-series, the field bits that are always 0, the field bits that are flag bits, etc.).

In some cases, the expected positions for the first bit values in the bit-field can be any of the positions in the bit-field having the first bit value.

In some cases, the bit-field can be analyzed by sub-field identification module 140 to identify a left border of the at least one sub-field by scanning the field bits of the bit-field from right-to-left. For each scanned field bit in the bit-field having a first bit value of 1 at an expected position of the bit-field for the first bit value (the determination of the expected position is discussed above), with the exception of identified flag sub-fields, if any, sub-field identification module 140 can be configured to determine a first number of consecutive bits having a second bit value of 0 immediately preceding the respective scanned field bit, i.e. on the most-significant (left) side of the respective scanned field bit. Upon determining that the first number of consecutive bits is greater than the first threshold, sub-field identification module 140 can be configured to identify the left border of the at least one sub-field at a left side of the most-significant bit of the first number of consecutive bits.

In some cases, the above-described analysis of the bit-field can be used to determine borders between sub-fields that are numerical sub-fields and categorical sub-fields with continuous codes (an example of a sub-field that has a signature of a categorical sub-field with continuous codes is the sub-field represented by hexadecimal numerals 007F).

In some cases, e.g., in cases in which the above described analysis of the bit-field is not sufficient to determine all of the sub-fields in the bit-field, sub-field identification module 140 can be configured to analyze the bit-field in one or more additional ways.

In some cases, sub-field identification module 140 can be configured to analyze at least a portion of the bit-field by: (a) determining two or more consecutive field bits of the field that tend to change simultaneously in the one or more input time-series; and (b) clustering field bits of the at least a portion of the bit-field into two or more adjacent distinct sub-portions, each adjacent distinct sub-portion of the adjacent distinct sub-portions corresponding to a sub-field within the field, and at least one adjacent distinct sub-portion of the adjacent distinct sub-portions including two or more consecutive field bits that correspond to the consecutive field bits of the field that tend to change simultaneously in the one or more input time-series.

In some cases, sub-field identification module 140 can be configured to determine that consecutive field bits of the field tend to change simultaneously by determining a ratio between a first number of input instances in the one or more input time-series in which only some of the consecutive field bits change and a second number of input instances in the one or more input time-series in which some of the consecutive field bits change together with some other bits.

Alternatively, in some cases, sub-field identification module 140 can be configured to determine that the consecutive field bits tend to change simultaneously by counting a number of times that each given field bit of the consecutive field bits changes together with one or more field bits following the given bit field and a number of times that the respective given field bit of the consecutive field bits changes together with one or more field bits preceding the given field bit.

In some cases, sub-field identification module 140 can be configured to identify one or more flag sub-field borders of a corresponding one or more flag sub-fields within the field, if any, based on the fixed bit positions of the flag sub-fields within the field, if any.

In some cases, the flag sub-field border can be identified based on additional prior knowledge for analyzing the bit-field, examples of additional prior knowledge appearing above.

Returning to the sequence of operations 200, sub-field identification module 140 can be configured, in some cases, to determine, for each postponed new time-series instance, if any, whether to process the respective postponed new time-series instance (block 224).

To determine whether to process a postponed new time-series instance, sub-field identification module 140 can be configured to determine if the postponed new time-series instance is consistent with the sub-field division of the analyzed bit-field. If consistent, sub-field identification module 140 can be configured to process the postponed new time-series instance in light of all the already-processed bit-patterns, by performing the same checks on the bit-wise—or operations of all the bit-patterns already selected, with the addition of the currently processed bit pattern of the postponed new time-series instance. If not consistent, sub-field identification module 140 can be configured to ignore the postponed new time-series instance.

It is to be noted that, with reference to FIG. 2, some of the blocks can be integrated into a consolidated block or can be broken down to a few blocks and/or other blocks may be added. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for detecting Controller Area Network (CAN) messages anomalies, the system comprising a processor configured to:
   obtain a training set including a plurality of training CAN messages associated with respective one or more vehicles, each training CAN message having properties including (a) a CAN message type, (b) a size, (c) a payload, and (d) a corresponding timestamp; wherein for each CAN message type appearing in the plurality of training CAN messages of the training set, the timestamps of the training CAN messages of the corresponding CAN message type are derived from a non-stationary distribution, so that the distribution of interarrival times between CAN messages of the corresponding CAN message type is not constant in time, wherein the training set is ordered according to an interception order of the CAN messages on the respective vehicles; and
   train an anomaly detection model, using the training set, the anomaly detection model comprising one or more CAN message type anomaly detection models for one or more respective CAN message types that appear in the training set, each of the CAN message type anomaly detection models characterizing a functional dependency, between one or more parts of values of the payloads and interarrival times of CAN messages of the respective CAN message type, the interarrival times being determined using the timestamps of the CAN messages of the respective CAN message type;
   wherein the anomaly detection model is usable for classifying an unclassified CAN message of a given CAN message type as anomalous or non-anomalous using the CAN message type anomaly detection model associated with the given CAN message type.

2. The system of claim 1, wherein each of the CAN message type anomaly detection models is trained to learn the functional dependency by learning dependencies between the one or more parts of values of the payloads of the CAN messages of the respective CAN message type within the training set and the interarrival time of the CAN messages of the respective CAN message type within the training set.

3. The system of claim 2, wherein the processor is configured to learn the dependencies using a gated Recurring Neural Network (gRNN) comprising a plurality of gated units, (a) each gated unit receives (i) the payload of a respective CAN message of the respective CAN message type within the training set, and (ii) a temporal vector comprising one or more values based on the timestamps of at least the respective CAN message, and (b) at least one gate of each node is factored based on the temporal vector.

4. The system of claim 3, wherein the processor is further configured use the gRNN to learn the functional dependencies based on autoencoding.

5. The system of claim 3, wherein at least one of the values is an interarrival time between the respective CAN message of the respective CAN message type within the training set and the subsequent CAN message of the respective CAN message type within the training set.

6. The system of claim 1, wherein the processor is further configured to:
   receive an ordered sequence of classification CAN messages of a classification CAN message type, ordered according to a second interception order of the classification CAN messages on a given vehicle, the classification CAN messages including at least one unclassified CAN message unclassified as anomalous or non-anomalous; and
   classify the unclassified CAN message as anomalous or non-anomalous using the CAN message type anomaly detection model associated with the classification CAN message type, giving rise to a classified CAN message.

7. The system of claim 6, wherein the classification of the unclassified CAN message is performed by inputting the ordered sequence of classification CAN messages into the CAN message type anomaly detection model associated with the classification CAN message type.

8. The system of claim 7, wherein the processor is further configured to perform an action upon the classified CAN message being classified as anomalous.

9. The system of claim 8, wherein the action includes one or more of the following:
   (a) providing an alert to an entity indicative of the classified CAN message being anomalous; or
   (b) performing a prevention measure for blocking or correcting the classified CAN message wherein the classified CAN message is classified as anomalous before it is transmitted on a CAN bus of a monitored vehicle.

10. The system of claim 9, wherein the entity is one or more of: a driver of a vehicle associated with the classified CAN message, a mechanic service provider, a cyber analyst, a car manufacturer, an Original Equipment Manufacturer (OEM), or a fleet manager.

11. A method for detecting Controller Area Network (CAN) messages anomalies, the method comprising:
   obtaining, by a processor, a training set including a plurality of training CAN messages associated with respective one or more vehicles, each training CAN message having properties including (a) a CAN message type, (b) a size, (c) a payload, and (d) a corresponding timestamp;

wherein for each CAN message type appearing in the plurality of training CAN messages of the training set, the timestamps of the training CAN messages of the corresponding CAN message type are derived from a non-stationary distribution, so that the distribution of interarrival times between CAN messages of the corresponding CAN message type is not constant in time, wherein the training set is ordered according to an interception order of the CAN messages on the respective vehicles; and training, by the processor, an anomaly detection model, using the training set, the anomaly detection model comprising one or more CAN message type anomaly detection models for one or more respective CAN message types that appear in the training set, each of the CAN message type anomaly detection models characterizing a functional dependency, between one or more parts of values of the payloads and interarrival times of CAN messages of the respective CAN message type, the interarrival times being determined using the timestamps of the CAN messages of the respective CAN message type;

wherein the anomaly detection model is usable for classifying an unclassified CAN message of a given CAN message type as anomalous or non-anomalous using the CAN message type anomaly detection model associated with the given CAN message type.

12. The method of claim 11, wherein each of the CAN message type anomaly detection models is trained to learn the functional dependency by learning dependencies between the one or more parts of values of the payloads of the CAN messages of the respective CAN message type within the training set and the interarrival time of the CAN messages of the respective CAN message type within the training set.

13. The method of claim 12, wherein the CAN message type anomaly detection models learns the dependencies using a gated Recurring Neural Network (gRNN) comprising a plurality of gated units, (a) each gated unit receives (i) the payload of a respective CAN message of the respective CAN message type within the training set, and (ii) a temporal vector comprising one or more values based on the timestamps of at least the respective CAN message, and (b) at least one gate of each node is factored based on the temporal vector.

14. The method of claim 13, further comprising using the gRNN to learn the functional dependencies based on auto-encoding.

15. The method of claim 13, wherein at least one of the values is an interarrival time between the respective CAN message of the respective CAN message type within the training set and the subsequent CAN message of the respective CAN message type within the training set.

16. The method of claim 11, further comprising:
receiving, by the processor, an ordered sequence of classification CAN messages of a classification CAN message type, ordered according to a second interception order of the classification CAN messages on a given vehicle, the classification CAN messages including at least one unclassified CAN message unclassified as anomalous or non-anomalous; and classifying, by the processor, the unclassified CAN message as anomalous or non-anomalous using the CAN message type anomaly detection model associated with the classification CAN message type, giving rise to a classified CAN message.

17. The method of claim 16, wherein the classification of the unclassified CAN message is performed by inputting the ordered sequence of classification CAN messages into the CAN message type anomaly detection model associated with the classification CAN message type.

18. The method of claim 17, further comprising performing, by the processor, an action upon the classified CAN message being classified as anomalous.

19. The method of claim 18, wherein the action includes one or more of the following:
(a) providing an alert to an entity indicative of the classified CAN message being anomalous; or
(b) performing a prevention measure for blocking or correcting the classified CAN message wherein the classified CAN message is classified as anomalous before it is transmitted on a CAN bus of a monitored vehicle.

20. A non-transitory computer readable storage medium having computer readable program code embodied therewith, the computer readable program code, executable by a processor to perform a method for detecting Controller Area Network (CAN) messages anomalies, the method comprising:
obtaining, by the processor, a training set including a plurality of training CAN messages associated with respective one or more vehicles, each training CAN message having properties including (a) a CAN message type, (b) a size, (c) a payload, and (d) a corresponding timestamp;

wherein for each CAN message type appearing in the plurality of training CAN messages of the training set, the timestamps of the training CAN messages of the corresponding CAN message type are derived from a non-stationary distribution, so that the distribution of interarrival times between CAN messages of the corresponding CAN message type is not constant in time, wherein the training set is ordered according to an interception order of the CAN messages on the respective vehicles; and training, by the processor, an anomaly detection model, using the training set, the anomaly detection model comprising one or more CAN message type anomaly detection models for one or more respective CAN message types that appear in the training set, each of the CAN message type anomaly detection models characterizing a functional dependency, between one or more parts of values of the payloads and interarrival times of CAN messages of the respective CAN message type, the interarrival times being determined using the timestamps of the CAN messages of the respective CAN message type;

wherein the anomaly detection model is usable for classifying an unclassified CAN message of a given CAN message type as anomalous or non-anomalous using the CAN message type anomaly detection model associated with the given CAN message type.

* * * * *